United States Patent
Jiménez Peris et al.

(10) Patent No.: US 9,760,597 B2
(45) Date of Patent: Sep. 12, 2017

(54) SYSTEM AND METHOD FOR HIGHLY SCALABLE DECENTRALIZED AND LOW CONTENTION TRANSACTIONAL PROCESSING X

(71) Applicant: UNIVERSIDAD POLITÉCNICA DE MADRID, Madrid (ES)

(72) Inventors: Ricardo Jiménez Peris, Madrid (ES); Marta Patiño Martínez, Madrid (ES)

(73) Assignee: UNIVERSIDAD POLITÉCNICA DE MADRID, Madrid (ES)

( * ) Notice: Subject to any disclaimer, the term of this patent is extended or adjusted under 35 U.S.C. 154(b) by 0 days.

(21) Appl. No.: 14/908,892

(22) PCT Filed: Nov. 16, 2012

(86) PCT No.: PCT/EP2012/072811
§ 371 (c)(1),
(2) Date: Jan. 29, 2016

(87) PCT Pub. No.: WO2013/072451
PCT Pub. Date: May 23, 2013

(65) Prior Publication Data
US 2016/0179876 A1 Jun. 23, 2016

Related U.S. Application Data

(60) Provisional application No. 61/561,508, filed on Nov. 18, 2011.

(51) Int. Cl.
*G06F 17/30* (2006.01)
*H04L 29/06* (2006.01)
*G06F 11/14* (2006.01)

(52) U.S. Cl.
CPC .. *G06F 17/30377* (2013.01); *G06F 17/30353* (2013.01); *G06F 17/30371* (2013.01);
(Continued)

(58) Field of Classification Search
CPC ........... G06F 11/1474; G06F 17/30353; G06F 17/30371; G06F 17/30377; G06F 2201/82
See application file for complete search history.

(56) References Cited

U.S. PATENT DOCUMENTS

| 7,206,805 B1 * | 4/2007 | McLaughlin, Jr. | G06F 9/466 707/999.01 |
| 2012/0102006 A1 * | 4/2012 | Larson | G06F 17/30575 707/703 |
| 2013/0124475 A1 * | 5/2013 | Hildenbrand | G06F 17/30351 707/636 |

OTHER PUBLICATIONS

Chen Zhang et al; "Supporting multi-row distributed transactions with global snapshot isolation using bare-bones HBase," Grid Computing, 2010, 11th IEEE/ACM International Conference on, IEEE, pp. 177-184.

(Continued)

*Primary Examiner* — Dinku Gebresenbet
(74) *Attorney, Agent, or Firm* — Tristan A. Fuierer; Moore & Van Allen, PLLC

(57) ABSTRACT

A system and method for decentralized transaction processing that reduce contention by a number of techniques. First, the transactional management system is decomposed in a number of components that can be scaled out and/or scaled up independently and in a composable way. Second, transactions are committed in parallel without blocking each other. Third, applications can progress when the transactions updates are durable even if the writes of the transaction have not yet completed. Fourth, transactional consistency is guaranteed by making readable only gap-free prefixes of committed update transactions, without blocking the commit of new transactions. Fifth, session consistency is guaranteed by delaying the start of a new transaction till the snapshot of any previous update transaction in the same session is readable.

4 Claims, 2 Drawing Sheets

(52) U.S. Cl.
CPC .......... *H04L 67/42* (2013.01); *G06F 11/1474* (2013.01); *G06F 2201/82* (2013.01)

(56) References Cited

OTHER PUBLICATIONS

Flavio Junqueira et al; "Lock-free transactional support for large-scale storage systems," Dependable Systems and Networks Workshops, 2011, IEEE/IFIP 41st International Conference on, IEEE, pp. 176-181.
Daniel Peng et al; "Large-scale Incremental Processing Using Distributed Transactions and Notifications," 2010, http://research.google.com/pubs/pub36726.html, pp. 3-6.
International Search Report, dated Apr. 12, 2013.

\* cited by examiner

SYSTEM AND METHOD FOR HIGHLY SCALABLE DECENTRALIZED AND LOW CONTENTION TRANSACTIONAL PROCESSING X

CROSS-REFERENCE TO RELATED APPLICATIONS

This application is filed under the provisions of 35 U.S.C. §371 and claims the priority of International Patent Application No. PCT/EP2012/072811 filed on 16 Nov. 2012 entitled "SYSTEM AND METHOD FOR HIGHLY SCALABLE DECENTRALIZED AND LOW CONTENTION TRANSACTIONAL PROCESSING X" in the name of Ricardo JIMÉNEZ PERIS, et al., which claims priority to U.S. Provisional Patent Application No. 61/561,508, filed on 18 Nov. 2011, both of which are hereby incorporated by reference herein in their entirety.

FIELD OF THE INVENTION

The present invention refers to the field of transactional data management and more particularly, distributed transactional data management.

BACKGROUND OF THE INVENTION

Organizations rely more and more on computer-based systems to store and access information. Information is stored in data stores. A key issue to store and access information in data stores is the consistency guaranteed by the data store. One of the most common ways to provide consistency is by means of transactional data management typically provided by databases and multi-tier systems, and more recently by other modern data stores.

A transaction is a process that enables concurrent access to shared data and guarantee implicitly (without any direct coordination among client applications) the so-called ACID properties, atomicity, consistency, isolation and durability. Atomicity guarantees that the effect of a transaction is all or nothing, that is, that either all its writes take effect or none of them, even in the advent of failures. Consistency is a property guaranteed by the correctness of the client applications, if a transaction is executed over a database in a consistent state with respect the application semantics the result after executing and committing the transaction should again be consistent, that is, the client applications should be correct. Isolation is a property that regulates how concurrent transactions are managed so they observe and write data with a given set of guarantees. Durability is a property that states that once a transaction has committed successfully its writes cannot be lost even in the advent of failures.

Isolation of transactions is guaranteed by means of concurrency control. One common concurrency control mechanism is called snapshot isolation. Snapshot isolation splits atomicity in two points: reads happen logically at the start of the transaction and writes happen logically at the end of the transaction. This is a slightly more relaxed isolation level than serializability in which the atomicity of a transaction happens at a single point, that is, the transaction read and writes happen at a single logical point. Snapshot isolation only disallows concurrent writes, whilst serializability additionally disallows concurrent reads and writes on the same data items.

A key problem in transactional data management is how to scale out the processing. That is, how to use an increasing number of computational resources to process a higher rate of transactions.

A transaction upon start is assigned a snapshot of the database, that is, the set of committed writes that it will observe. Snapshot isolation is a multi-versioning isolation method. For each data item multiple versions are kept that are tagged with order labels. These labels are also referred as timestamps in the state of art. When a read only transaction (transactions that have not performed any write) commit, no special action is taken. When an update transaction (a transaction that has performed at least one write) is committed, it is assigned an order in the sequence of committed transactions. That is, for any two committed update transactions the order in the sequence determines which one committed before the other. Snapshot isolation is currently guaranteed by committing update transactions sequentially and giving new started transactions a snapshot corresponding to the current sequence of committed update transactions.

Additionally, concurrent transactions are not allowed to update common data items. Conflicts are either resolve when they happen by aborting one of the conflicting transactions or at commitment time by aborting a committing transaction that is concurrent to a conflicting transaction that has committed before it.

The kind of transactional processing creates contention due to several reasons. The main reason is that commit processing and the synchronization between the start of new transactions and the commit of completing become a bottleneck.

In the present invention, this bottleneck is removed and its ultimate bottleneck still enables to execute very high rates of update transactions preserving full transactional consistency.

DESCRIPTION OF THE INVENTION

The invention solves the problems mentioned in the state of the art by implementing a transactional management system characterized in that transactional management is decomposed in different components that can be allocated to different nodes wherein at the server side the transactional management system comprises one commit server: is a component that provides labels, called commit labels, from an ordered sequence. This ordered sequence of labels represents the sequence of committed transactions. A commit label A that appears before another commit label B in the sequence is said to be lower than B or earlier than B and the label B is said to be higher than A or later than A, one snapshot server: is a component that provides the latest snapshot (set of committed updates) at which transactions can be started with isolation guarantees. This snapshot is represented by the commit label of the latest update transaction included in the snapshot and is also called snapshot label, at least a transaction manager: A transaction manager manages the lifecycle of a subset of the transactions. Each transaction is managed by one transaction manager.

at least a conflict manager: A conflict manager is a component that detects and handles conflicting transactions. Each conflict manager takes care of handling the conflict of a set of keys. Each key is, therefore, handled by a single conflict manager.

at least a logger: A logger is a component that is in charge of guaranteeing the durability of updates of a subset of committed transactions.

at least a data manager: A data manager is a component that manages operations over data. A data manager manages a subset of keys, that is, it is responsible for operations over data which keys belong to the subset it is responsible for. A data manager can store the data either locally or remotely. Each key is associated to a single data manager.

at the client side, one or more applications adapted to interact directly or indirectly with the server, each application adapted to i. connect to a transaction manager;

Each application interacts with the transactional data management system via a transaction manager. The client application first connects to one of the transaction managers (for instance, taking its address from a well-known registry where the addresses of all available transaction managers are stored) and gets associated to it. The application can perform a number of transactions with the connected transaction manager. Each transaction is performed by first invoking the start operation, then invoking one or more read and write operations and finally invoking either commit or abort, ii. perform zero or more iterations of the following steps:

1. request to a transaction manager to start a transaction;

When an application connects to a transaction manager the transaction manager associates to the application a unique connection identifier that is stored locally and returned as result of the connect operation. Upon invocation of the start operation by an application a transaction manager associates to it a unique transaction identifier, associates the transaction to one data manager and selects a start label lower or equal to the latest snapshot label received from the snapshot server (typically the latest one received from the snapshot server) and stores in a local transaction table the transaction identifier, the connection identifier, the start label and the data manager identifier.

2. request to the transaction manager zero or more read, and write operations

A transaction manager upon receiving a read operation invocation from an application forwards the operation to the data manager associated to the transaction. The transaction manager upon receiving the result from the read operation forwards the results to the application.

A transaction manager upon receiving a write operation invocation from a client application, it forwards the operation to the data manager associated to the transaction.

Upon receiving the result from the write operation, if it was successful, it stores the returned updates associated to the transaction identifier and returns the result to the application. If the operation was unsuccessful due to a conflict detected by a conflict manager, the transaction manager aborts the transaction, removing all the local information associated to the transaction and stores the transaction identifier with the abort status in the transaction table.

3. request to the transaction manager to commit or abort the transaction;

A transaction manager upon receiving an abort operation invocation from a client application forwards it to the associated data manager. The abort transaction operation indicates the transaction identifier. Afterwards, it removes all the associated information to the transaction and stores the transaction identifier with the abort status in the transaction table. The data manager upon receiving an abort operation forwards it to all the data managers involved in the transaction. Each data manager discards all the private versions associated to the transaction identifier.

iii. be notified by the transaction manager that the transaction has completed either committing or aborting;

wherein each transaction manager is adapted to start, abort and commit transactions and execute read and write operations upon request from its connected applications;

The transaction manager supports the operations: connect, start transaction, read, write, commit and abort. The connect, start, commit transaction operations do not have parameters. The read operation has as parameter a read-only query. The write operation has as parameter an update query (that is, a query that performs one or more updates: insertions, deletions and modifications, and possibly some reads).

wherein the commit server is adapted to send to each transaction manager labels from an ordered sequence, such that, each label is only sent to a transaction manager, labels are sent by the commit server either proactively or reactively upon request from transaction managers wherein the snapshot server is adapted to:

1. receive the used and discarded labels.

The snapshot server receives labels. These labels might have been discarded (that is, produced by the commit server but not used to label any update transaction) or committed (that is, the writes of the update transaction are durable and readable from the data manager with a snapshot with a label equal or later to its commit label).

2. report snapshot labels in non-decreasing order such that for each produced label it has received all labels equal or lower to it either proactively or reactively upon request from transaction managers.

The snapshot server provides snapshot labels in non-decreasing order. Any snapshot label, S, provided by the snapshot server guarantees that the snapshot server has received all labels lower than S. The snapshot server periodically removes a set of labels such that the set is contiguous, they are older than the rest of stored labels, and there is a label contiguous to the oldest one of them.

wherein each transaction manager is also adapted to:

1. assign as start label for starting a transaction one, among those obtained from the snapshot server, later or equal than the last one used for the previous transaction.

The transaction manager is adapted to get periodically snapshot labels from the snapshot server or request them explicitly.

When an application connects to a transaction manager the transaction manager associates to the application a unique connection identifier that is stored locally and returned as result of the connect operation. Upon invocation of the start operation by an application a transaction manager associates to it a unique transaction identifier, associates the transaction to one data manager and selects a start label lower or equal to the latest snapshot label received from the snapshot server (typically the latest one received from the snapshot server) and stores in a local transaction table the transaction identifier, the connection identifier, the start label and the data manager identifier.

Periodically, one of the transaction managers collects from all other transaction managers the local oldest start label for all the transactions each of them manages. Upon receiving of these labels, it obtains the oldest one among them and notifies all conflict managers and all data managers that this label is the oldest snapshot of an active transaction.

2. assign as commit label to an update transaction willing to commit one of the unused labels received from the commit server, marking it as used.

A transaction manager is adapted to get periodically a set of commit labels from the commit server (in proactive mode) or to request them explicitly to the commit server (in reactive mode). Each transaction manager periodically notifies to the snapshot server the commit labels that have been discarded and the commit labels of committed transactions. The commit transaction operation indicates the transaction identifier and the commit label.

3. forward each read operation with the start label to a data manager.

The read operation is an arbitrary read operation that might read zero or more data items and return a set of results (that might be empty). A transaction manager upon receiving a read operation invocation from an application forwards the operation to the data manager associated to the transaction. The transaction manager upon receiving the result from the write operation forwards the results to the application.

4. upon completion of a transaction, send a log request with all the changes performed by the transaction to a logger.

A transaction manager upon receiving a commit operation invocation from an application it checks whether the transaction performed any update or not. If the transaction did not perform any update, the information about the transaction is removed, the commit operation invoked on the data manager associated to that transaction, and finally the control returned to the application. If the application performed at least one update, the transaction manager takes one unused commit label and associates it to the transaction being committed storing it in the transaction table. Then, in parallel it sends all the stored updates to a logger and also invokes in parallel the commit operation on the associated data manager. When the logger replies the control is returned to the application and the transaction manager stores that the transaction is durable in the transaction table and replies to the application that the transaction has been committed. When the commit operation returns from the data manager, the transaction manager stores in the transaction table that the transaction is readable. When a transaction is both durable and readable, then the transaction manager stores in the transaction table that the transaction is committed.

5. upon notification of commit from the logger, notify the application about the transaction commit.

In this way, commit notifications to applications are made as soon as the transaction is durable independently of its writes having completed, as the logger notifies the transaction manager about the durability of the transaction once the durability satisfies a durability level and, only then, the transaction manager notifies the application about the transaction commit.

wherein each logger is adapted to:

1. be configured with a durability level that determines whether the notification of durability can be given when the log request has been stored either in memory or in persistent storage of the logger, This log request contains the set of writes, the transaction identifier and the transaction commit label. Each logger might be replicated, that is, a set of loggers that store the same copy of updates. The logger can be configured with different durability levels that determine when to return from the log request.

If an individual logger is used, the there are two possible durability levels: when the logger has stored the log request in memory and when the logger has stored in persistent storage the request. If the logger is replicated, then the durability level determines which fraction of loggers should have the log request stored in memory and which fraction of loggers should have the log request stored in persistent storage before notifying that the log request has been made durable.

2. receive the log request with the set of changes performed by a transaction and store them in memory and in persistent storage;

A transaction manager sends all the stored updates of a transaction to a logger.

3. notify the transaction manager about the durability of the transaction when the durability satisfies the configured durability level, When the log request is durable according to its configuration the logger notifies about the durability of the transaction indicating its transaction identifier.

wherein each conflict manager is adapted to:

1. be responsible to detect conflicts for a subset of keys;
2. receive the key of updated items labelled with the transaction start label A conflict manager receives notifications about: writes over data with keys it manages (update notification), completion of update transactions (either commit or abort), and the oldest start label of active transactions, that is, transactions that have started but not completed. An update notification contains at least, the key of the written datum, the identifier of the update transaction and the start label of the transaction.

3. upon reception of a key of an updated item, store the key, the transaction identifier and its start label and check whether the same key has been updated by any concurrent transaction;

Upon an update notification, the conflict manager checks whether there is any update associated to the same key from a concurrent transaction (two transactions are concurrent if both have started and none has completed, or if the start label of one transaction is in between the start and commit label of a committed transaction) to the one associated to the notified update.
   a. if the checking is positive, the conflict manager is adapted to reply the corresponding transaction manager with an abort notification and also to store this decision;
      If there is a stored conflicting update, the conflict manager notifies the abort of one of the two conflicting transactions and keeps the information from the transaction not being aborted, and discards the information of the aborted transaction.
   b. if the checking is negative, it is adapted to store the transaction identifier, the key of the updated item and the transaction start label;
      If there is no stored conflicting update, it stores the transaction identifier, the key and the start label of the update transaction. A transaction completion notification contains at least, the transaction identifier, the transaction outcome (commit or abort) and if the transaction has been committed its commit label.
4. receive the abort notification of aborted transactions
5. upon the reception of an abort notification of a transaction, it is adapted to remove the information about the transaction
   A conflict manager upon receiving a transaction completion notification of the abort of a transaction removes all the updates stored with the received transaction identifier.
6. receive the commit notification of committed transactions with their commit label;
7. upon the reception of a commit notification of a transaction, it is adapted to store its transaction identifier and commit label;
   A conflict manager upon receiving a transaction completion notification of the commit of a transaction adds the commit label to all the stored updates with the same transaction identifier.

wherein each data manager is adapted to:
1. store the data items corresponding to a subset of keys,
2. upon receiving a write or read operation from a transaction manager, to forward write or read operations to the data managers responsible for the accessed data and to collect the results returning them to the requesting transaction manager,
   Upon receiving a read or write operation, the data manager translates it into a query plan. This query plan involves one or more read or write operations and the computation of the final result of the read or write operation. The data manager is adapted to execute the query plan by sending read and or write operations to one or more data managers and combining the received results. Read operations performed by each involved data manager are performed on the snapshot indicated by the start label. The data manager computes the final result of the read or write operation and returns the resulting result set. Each item in the result set its tagged with its commit label.
3. perform reads given a transaction start label and to provide the latest committed versions of the read data items with a commit label equal or earlier than the start label,
   The data manager upon receiving a read operation returns the latest data item with a commit label equal or earlier to the start label.
4. perform writes on a private version of the data only visible to read operations from the writing transaction.
   The data manager upon receiving a write operation executes it over the data managers responsible for the accessed data. The data managers keep track of which data managers have performed writes for each transaction. The data manager responsible for the key notifies the conflict manager responsible for that key about the update and performs the write on a private version of the item and tags it with the transaction identifier. This private version will only be readable to the update transaction performing the write. If the update transaction reads later the key of this item, it will read the latest written item by the transaction on the private version. If the conflict manager did not detect a conflict, the operation returns. If there was a conflict, it returns that the transaction aborted. The data manager that received the write operation returns the received result.
5. upon commit of the transaction, label all private versions of the transaction with a transaction commit label and to make them public.
   The data manager tags each private version with the commit label indicated in the commit operation making them public and returns.

The present invention also takes into account the design of a method for processing transactions operating on a transactional management system as described before, wherein said method comprises the elements of the system interacting with each other in such a way that:
   transactions are committed asynchronously and in parallel as each commit request is accepted by the transaction manager at any time and in any order and processed immediately without waiting for any other start or commit operation to complete, assigning as commit label an unused commit label from those obtained from the commit server,
   transactions are started without blocking as each application start request is accepted by the transaction manager at any time and in any order, assigning as start label for starting a transaction one, among those labels obtained from the snapshot server, being equal or later than the latest one used,
   transactional consistency is guaranteed by making readable only snapshots corresponding to gap free prefixes of update transactions that are both durable and their writes have completed, as the data manager
   performs reads on the snapshot indicated by the given transaction start label,
   provides the latest committed versions of the read data items with a commit label equal or earlier,
   and performs item writes on a private version of the data only visible to read operations from the writing transaction.

As a summary of the invention, it comprises a system and a method for decentralized transaction processing that reduce contention by a number of techniques. First, the transactional management system is decomposed in a number of components that can be scaled out and/or scaled up independently and in a composable way. Second, transactions are committed in parallel without blocking each other. Third, applications can progress when the transactions updates are durable even if the writes of the transaction have not yet completed. Fourth, transactional consistency is guaranteed by making readable only gap-free prefixes of committed update transactions, without blocking the commit of new transactions. Fifth, session consistency is guaranteed by delaying the start of a new transaction till the snapshot of any previous update transaction in the same session is readable.

DESCRIPTION OF THE FIGURES

These and other characteristics and advantages of the invention will become clearly understood in view of the detailed description of the invention which becomes apparent from a preferred embodiment of the invention, given just as an example and not being limited thereto, with reference to the drawings.

DETAILED DESCRIPTION OF THE INVENTION

The terms "component", "manager", "server" and "system" as used in this invention are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. An application running on a server and the server can be a component. One or more components can reside within a process and/or thread of execution, and a component can be localized on one computer and/or distributed between two or more computers or nodes.

The transactional management system comprises the following set of components: commit server, snapshot server, transaction manager, logger, conflict manager and data manager. One or more applications access the transactional management system directly or indirectly to manage their data with transactional guarantees.

Figure 1:
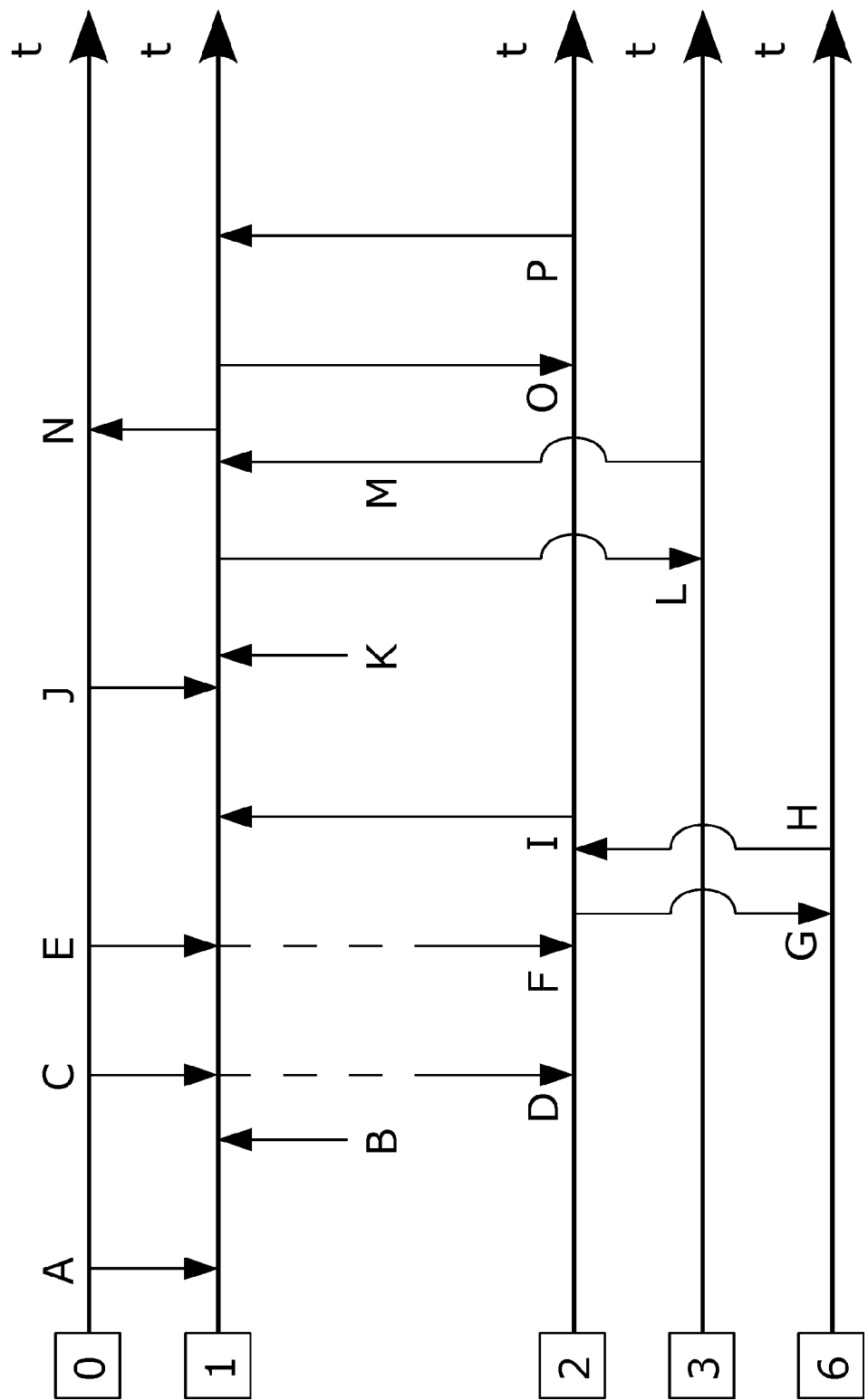
FIG. 1 In this figure an example of the system working as described is displayed in a view showing the following elements and actions represented in a sequential mode on a timeline.
Figure 3:
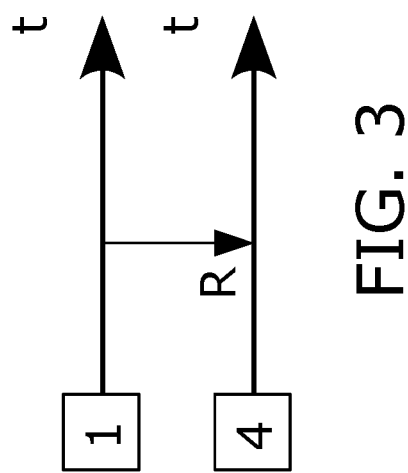
FIG. 3 In this figure a representation of a moment in the transaction is displayed wherein a transaction manager sends a set of used and unused labels to the snapshot server.
Figure 2:
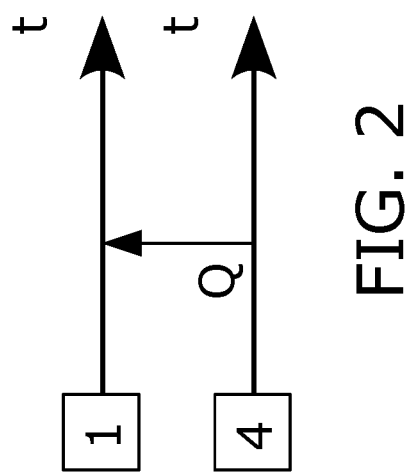
FIG. 2 In this figure a representation of a moment in the transaction is displayed wherein the snapshot server sends a start label to a transaction manager.
Figure 4:
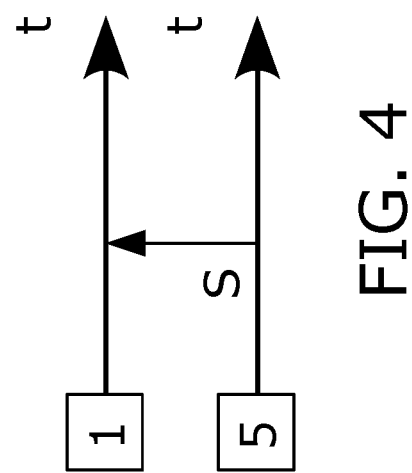
FIG. 4 In this figure a representation of a moment in the transaction is displayed wherein the commit server sends a commit label to the transaction manager.

One way in which elements communicate with each other is represented in FIG. 1 where we can see how a transaction is managed on a timeline in case of no conflicts. The following elements are represented;
 0. Application
 1. Transaction manager
 2. Data manager
 3. Logger
 4. Snapshot server
 5. Commit server
 6. Conflict manager The following actions are represented:
 A. Start transaction request from application
 B. Assign start label
 C. Read operation
 D. Forward read operation to data manager
 E. Write operation
 F. Forward write operation to data manager
 G. Check conflict
 H. No conflict detected
 I. Updates notification
 J. Commit transaction request from application
 K. Assign commit label
 L. Log request
 M. Durability confirmation to transaction manager
 N. Commit confirmation to application
 O. Commit (make updates public)
 P. Readability confirmation
 Q. Start label from snapshot server
 R. Used and unused labels
 S. Commit label An alternative embodiment of the system extends the aforementioned system as follows. The transaction managers notify periodically to the commit server about how many update transactions they have executed in the last period (for instance, upon receiving a set of commit labels from the commit server). The commit server computes the latest transaction rate known from each transaction manager and generates a set of labels for each of them which number is a function of their update transaction rates. Alternatively, the commit server might take into account the evolution of the transaction rates over time to guess which will be the transaction rate in the next period and adapt the proportion of label for each transaction manager accordingly. This embodiment can be extended by adopting the same period for the interaction between transaction managers and snapshot server. At the end of each period, the commit server sends new sets of commit labels to the transaction managers. Each transaction manager in addition to report to the commit server their last update transaction rate, they report to the snapshot server about the set of labels from the previous period. That is, they report about all labels of committed transactions, and all unused labels. The snapshot server upon receiving the notification of one or more transaction managers reports the current snapshot label.

The transactional management system can be used for different kinds of architectures of data management systems such us a multi-tier architecture with an application server layer and a data layer (e.g. Java Enterprise Edition), or a database system, a key-value store, a column-oriented data store, or any other kind of data store.

In another preferred embodiment, session consistency is guaranteed by delaying the start of new transactions from the same session till the writes of previous update transactions in the same session are durable and completed. This is guaranteed as the transaction manager, upon receiving the start of a transaction from an application that have executed previously an update transaction, waits to start a new transaction from this session till the latest notified snapshot label by the snapshot server is equal or greater than the last update transaction commit label of the application. The transaction manager uses as start label for the transaction such label.

In another preferred embodiment of the invention, garbage collection is performed. For this purpose, one of the transaction managers collects the start labels of the oldest active transactions from all transaction managers and obtains the oldest start label among them. Then, it sends a notification to all conflict managers and data managers of the oldest active transaction. Upon notification of the oldest start label of active transactions in the system:

Each conflict manager is adapted to discard the information about any transaction with an earlier commit label;

Each data manager is adapted to remove data versions that are not needed. A key might have associated one or more versions that are ordered by the commit labels. The oldest version with a commit label equal or lower than the oldest start label of active transactions is kept as well as later versions. Earlier versions are removed.

The invention claimed is:

1. A Distributed Transactional Management System having a client-server model comprising:
   a plurality of hardware processors and memory having computer-executable instructions stored thereon;
   at the server side the transactional data management system is decomposed into different hardware components: including;
      one commit server component,
      one snapshot server component,
      at least two transaction managers components,
      at least a conflict manager component,
      at least a logger component,
      at least a data manager component,
   wherein each different component is a combination of hardware and software and is allocated at different nodes,
   at the client side, one or more applications are configured to interact directly or indirectly with the server, each application is configured to
   i. connect to a transaction manager component,
   ii. perform more than zero iterations of the following steps:
      a. request to a transaction manager component to start a transaction;
      b. request to the transaction manager component more than zero read and write operations,
      c. request to the transaction manager component to commit or abort the transaction,
   iii. be notified by the transaction manager component that the transaction has completed either committing or aborting,
   wherein each transaction manager component is configured to, abort and commit transactions and execute read and write operations upon request from the connected applications to each transaction manager,
   wherein the commit server component is configured to send to each transaction manager labels from an ordered sequence, such that, each label is only sent to one transaction manager component, labels are sent by the commit server component either proactively, or reactively upon request from transaction managers components, wherein the ordered sequence of labels represents the sequence of committed transactions,
   wherein the snapshot server component is configured to:
      receive the used and discarded labels from the transaction managers components, wherein the discarded labels are the labels produced by the commit server component but not used to label any update transaction and the used labels are labels used to label an update transaction whose writes are durable and readable from the data manager component with a snapshot with a label equal or later to a commit label of the update transaction,
      report snapshot labels to the transactions managers components either proactively or reactively upon request from the transaction managers components,
      such that any snapshot label provided by the snapshot server component to the transaction managers components guarantees that the snapshot server component received all labels equal or lower than this label,
   wherein each transaction manager component is also configured to:
      assign as start label for starting a transaction one, among the labels obtained from the snapshot server component, later or equal than the last one used for the previous transaction,
      assign as committed label to an update transaction willing to commit one of the unused labels received from the commit server component, marking said unused label as used,
      forward each read operation with the start label to a data manager component,
      upon completion of a transaction, send a log request with all the changes performed by the transaction to a logger component,
      upon notification of commit from the logger component, notify the application about the transaction commit,
   wherein each logger component is configured:
      with a durability level that determines whether a notification of durability is given when the log request has been stored either in memory or in persistent storage of the logger component,
      to receive the log request with a set of changes performed by a transaction and store said changes in memory and in persistent storage,
      to notify the transaction manager component about the durability of the transaction when the durability satisfies the configured durability level,
   wherein each conflict manager component is configured to:
      detect conflicts for a subset of keys,
      receive the key of updated items labelled with the transaction start label,
      upon reception of a key of an updated item, store the key, the transaction identifier and the start label of said transaction and check whether the same key has been updated by any concurrent transaction,
   a. if the same key has been updated by any concurrent transaction, the conflict manager component is configured to reply the corresponding transaction manager component with an abort notification and also to store this the decision to abort,
   b. if the same key has not been updated by any concurrent transaction, the conflict manager component is configured to store the transaction identifier, the key of the updated item and the transaction start label,
      receive the abort notification of aborted transactions,
      upon the reception of an abort notification of a transaction, the conflict manager component is configured to remove the information about the transaction,
      receive the commit notification of committed transactions with their the respective commit label,
      upon the reception of a commit notification of a transaction, the conflict manager component is configured to store the its transaction identifier and commit label of said transaction,
   wherein each data manager component is configured to:
      store the data items corresponding to a subset of keys,
      upon receiving a write or read operation from a transaction manager component, to forward write or read operations to the data managers components responsible for the accessed data and to collect results and returning said results to the requesting transaction manager component, perform reads given a transaction start label and to provide the latest committed versions of the read data items with a commit label equal or earlier than the start label, perform writes on a private version of the data only visible to read operations from the writing transaction, upon commit of the transaction, label all private versions of the transaction with the transaction commit label and to make all private versions of said transaction public; and when the computer-executable instructions are executed to enable elements of the Distributed Transactional Management system to interact with each other and perform a method of transaction operation, the method comprising:

committing transactions asynchronously and in parallel as each commit request is accepted by the transaction manager component at any time and in any order and processed immediately without waiting for any other start or commit operation to complete, assigning as commit label an unused commit label from the unused commit labels obtained from the commit server component, starting transactions without blocking as each application start request is accepted by the transaction manager component at any time and in any order, assigning as start label for starting a transaction one, among the labels obtained from the snapshot server component, being equal or later than the latest one used, making readable only snapshots corresponding to gap-free prefixes of update transactions that are both durable and the writes have completed so that transactional consistency is guaranteed, as the data manager component performs reads on the snapshot indicated by the given transaction start label, provides the latest committed versions of the read data items with a commit label equal or earlier, and performs item writes on a private version of the data only visible to read operations from the writing transaction.

2. The system according to claim 1 wherein:
a. each transaction manager component is configured to send periodically to the commit server component the number of committed update transactions in at least a past period,
b. the commit server component is configured to send periodically to each transaction manager component a subset of labels that is a function of a fraction of committed update transactions sent by the transaction manager component.

3. The system according to claim 1 wherein if the application previously successfully committed any update transaction, the transaction manager component is configured to wait to start a new transaction from this session till the latest notified snapshot label by the snapshot server component is equal or greater than the last update transaction commit label of the application.

4. The system according to claim 1 wherein at least one of the transaction managers components is configured to collect the start labels of the oldest active transactions at all transaction managers components obtaining the oldest start label among the start labels of said oldest active transactions and sending the notification to the all conflict managers components and data managers components and wherein, each conflict manager component, is adapted to discard the information about any transaction with an earlier commit label; and, each data manager component is adapted to remove those versions that are earlier than the oldest version with a commit label equal or lower than the oldest start label of active transactions.

* * * * *